(12) United States Patent
Mardilovich et al.

(10) Patent No.: US 7,153,601 B2
(45) Date of Patent: Dec. 26, 2006

(54) FUEL CELL WITH EMBEDDED CURRENT COLLECTOR

(75) Inventors: Peter Mardilovich, Corvallis, OR (US); Niranjan Thirukkovalur, Corvallis, OR (US); David Champion, Lebanon, OR (US); Gregory Herman, Albany, OR (US); James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 378 days.

(21) Appl. No.: 10/282,772

(22) Filed: Oct. 29, 2002

(65) Prior Publication Data

US 2004/0081878 A1    Apr. 29, 2004

(51) Int. Cl.
*H01M 8/10*    (2006.01)
*H01M 2/00*    (2006.01)
(52) U.S. Cl. .............................. 429/32; 429/33; 429/34
(58) Field of Classification Search .................. 429/34, 429/44, 32, 33, 12
See application file for complete search history.

(56) References Cited

U.S. PATENT DOCUMENTS

| | | | | |
|---|---|---|---|---|
| 3,404,040 A * | 10/1968 | Mitoff et al. ................. | 429/34 |
| 4,372,038 A | 2/1983 | Goebel ....................... | 29/623.2 |
| 4,748,091 A | 5/1988 | Isenberg ...................... | 429/31 |
| 4,791,035 A | 12/1988 | Reichner ..................... | 429/31 |
| 4,971,830 A | 11/1990 | Jensen ......................... | 427/34 |
| 5,064,734 A | 11/1991 | Nazmy ........................ | 429/33 |
| 5,106,654 A | 4/1992 | Isenberg ..................... | 427/115 |
| 5,173,166 A | 12/1992 | Tomantschger et al. .... | 204/412 |
| 5,219,673 A | 6/1993 | Kaun .......................... | 429/32 |
| 5,302,274 A | 4/1994 | Tomantschger et al. .... | 204/412 |
| 5,856,035 A | 1/1999 | Khandkar et al. ........... | 429/32 |
| 5,908,713 A | 6/1999 | Ruka et al. .................. | 429/31 |
| 5,985,476 A | 11/1999 | Wachsman et al. .......... | 429/33 |
| 5,989,741 A * | 11/1999 | Bloomfield et al. ......... | 429/32 |
| 5,993,986 A | 11/1999 | Wallin et al. ................ | 429/32 |
| 6,013,386 A | 1/2000 | Lewin et al. ................ | 429/30 |
| 6,017,647 A | 1/2000 | Wallin ........................ | 429/33 |
| 6,025,084 A | 2/2000 | Kawasaki et al. ........... | 429/30 |
| 6,074,771 A | 6/2000 | Cubukcu et al. ............. | 429/30 |
| 6,106,967 A | 8/2000 | Virkar et al. ................ | 429/34 |
| 6,326,096 B1 | 12/2001 | Virkar et al. ................ | 429/30 |
| 6,361,893 B1 | 3/2002 | George et al. ............... | 429/31 |
| 2002/0045088 A1 | 4/2002 | Bronoel | |
| 2003/0012994 A1 | 1/2003 | Kushibiki et al. | |

FOREIGN PATENT DOCUMENTS

| | | |
|---|---|---|
| EP | 0603820 | 6/1994 |
| JP | 8195216 | 7/1996 |
| JP | 8264195 | 10/1996 |

(Continued)

OTHER PUBLICATIONS

I. Zhitomirsky and A. Petric, "The Electrodeposition of Ceramic and Organoceramic Films for Fuel Cells," *Journal of the Minerals, Metals & Materials Society*, Sep. 2001.
I. Zhitomirsky, "Ceramic Films Using Cathodic Electrodeposition," *Journal of the Minerals, Metals & Materials Society*, JOM-e, 52 (1) (2000).

(Continued)

*Primary Examiner*—Patrick Joseph Ryan
*Assistant Examiner*—Thomas H. Parsons

(57) ABSTRACT

A fuel cell includes one or more fuel cell assemblies. Each of the fuel cell assemblies has an electrolyte having a length, an anode having a length and disposed on one side of the electrolyte, and a cathode having a length and disposed on the same or the other side of the electrolyte. The fuel cell further includes a plurality of current collectors. Each of the current collectors is substantially embedded within, and continuously extends substantially the respective length of at least one of the electrolyte, anode and cathode.

56 Claims, 5 Drawing Sheets

FOREIGN PATENT DOCUMENTS

| | | |
|---|---|---|
| JP | 10079260 | 3/1998 |
| JP | 2002222656 | 8/2002 |
| JP | 2002222659 | 8/2002 |
| JP | 2002-313357 | * 10/2002 |
| JP | 2004139980 | 5/2004 |
| WO | WO 0124300 | 4/2001 |

OTHER PUBLICATIONS

A.A. Kulikovsky, J. Divisek, and A.A. Kornyshev, "Two-Dimensional Simulation of Direct Methanol Fuel Cell," *Journal of the Electrochemical Society*, 147 (3) 953-959 (2000).

English translation of Official Action dated Mar. 8, 2005 of counterpart Japanese Appln. No. 2003-364,317, (two pages).

* cited by examiner

FUEL CELL WITH EMBEDDED CURRENT COLLECTOR

BACKGROUND OF THE INVENTION

The present invention relates generally to fuel cells, and more particularly to fuel cells having embedded current collectors and methods of making the same.

Fuel cells use an electrochemical energy conversion of hydrogen and oxygen into electricity and heat. It is anticipated that fuel cells may be able to replace primary and secondary batteries as a portable power supply. In fuel cells, the fuel (containing a source of hydrogen) is oxidized with a source of oxygen to produce (primarily) water and carbon dioxide. The oxidation reaction at the anode, which liberates electrons, in combination with the reduction reaction at the cathode, which consumes electrons, results in a useful electrical voltage and current through the load.

As such, fuel cells provide a direct current (DC) voltage that may be used to power motors, lights, electrical appliances, etc. A solid oxide fuel cell (SOFC) is one type of fuel cell that may be useful in portable applications.

It is known that anode and cathode electrodes typically suffer from undesirable ohmic losses. As such, current collectors (high efficiency electron conductors) are typically placed on the top of the anode and/or cathode electrodes. However, current collectors placed on top of the anode/cathode may generally suffer from relatively poor current collector efficiency. It is also known that fuel cells suffer from undesirable catalytic/activation polarization losses. In addition to this, thin film current collectors generally agglomerate at high temperatures and become discontinuous. As a result, the current collectors lose efficiency.

SUMMARY OF THE INVENTION

The present invention solves the drawbacks enumerated above by providing a fuel cell which includes one or more fuel cell assemblies. Each of the fuel cell assemblies has an electrolyte having a length, an anode having a length and disposed on one side of the electrolyte, and a cathode having a length and disposed on the same or other side of the electrolyte. The fuel cell further includes a plurality of current collectors. Each of the current collectors is substantially embedded within, and continuously extends substantially the respective length of at least one of the electrolyte, anode and cathode.

BRIEF DESCRIPTION OF THE DRAWINGS

Objects, features and advantages of embodiments of the present invention may become apparent upon reference to the following detailed description and drawings, in which.

DETAILED DESCRIPTION OF THE EMBODIMENTS

Figure 1:
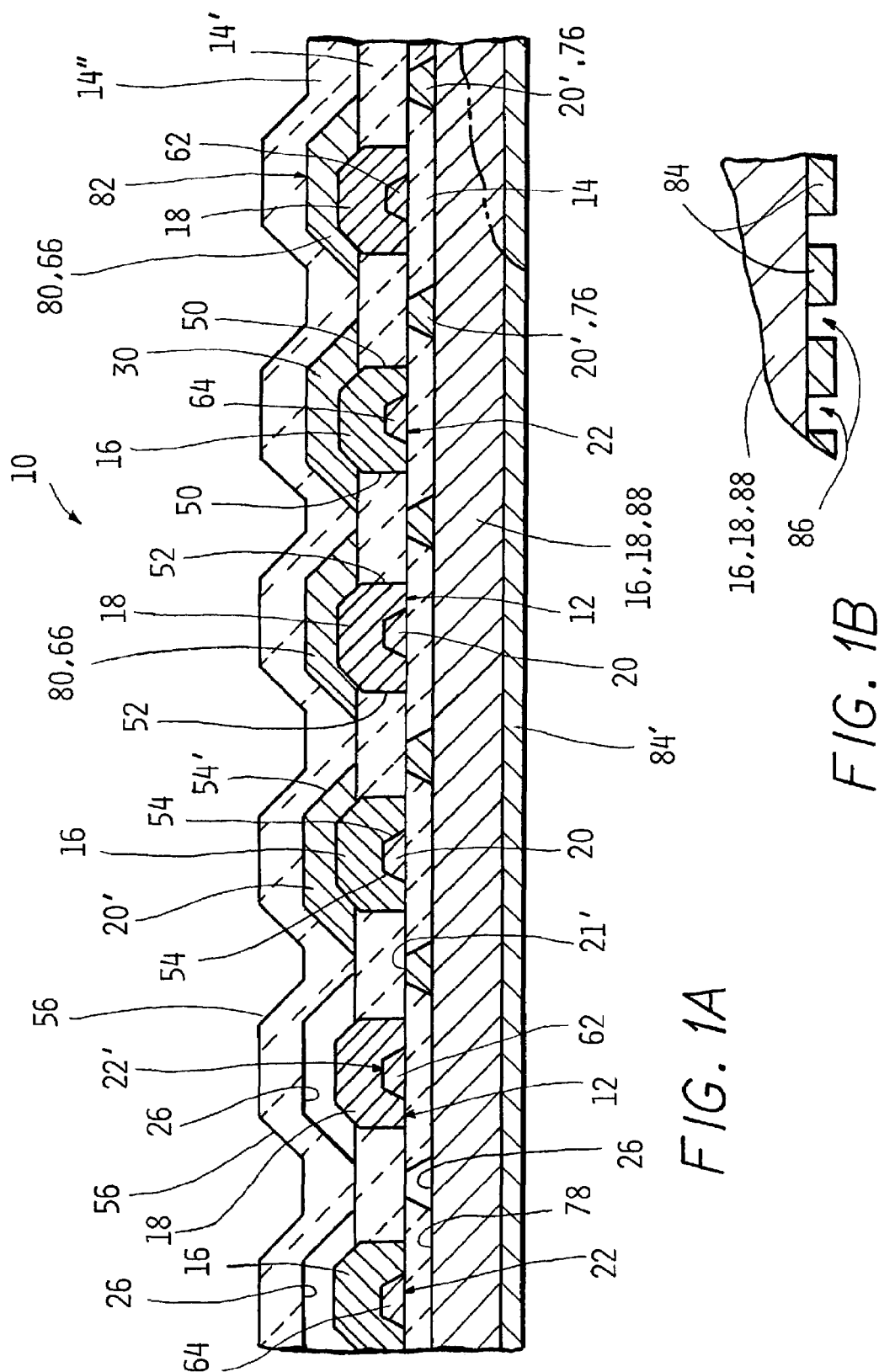
FIG. 1A is a cutaway, cross-sectional side view of an embodiment of the present invention, showing a plurality of conductive members and a plurality of current collectors.
FIG. 1B is cutaway, cross-sectional side view of an alternate configuration of the lower right edge (broken away in phantom) of the electrode support (anode or cathode) of the embodiment shown in FIG. 1A.

The present invention is predicated upon the unexpected and fortuitous discovery that performance of a fuel cell may be improved by substantially embedding current collectors within anode, cathode and/or electrolyte. It is to be understood that the term "substantially embedded" as used herein connotes that the conductive member and/or current collector is surrounded by the respective anode/cathode/electrolyte except for a discrete area. The discrete area is covered by one of anode, cathode or electrolyte, depending upon the specific embodiment of the invention. It is to be further understood that the term "completely embedded" as used herein connotes that the current collector is surrounded on all sides by the respective anode/cathode.

In embodiment(s) of the present invention, current collector efficiency is advantageously increased. Without being bound to any theory, it is believed that this is due to increased surface area contact between the current collector and electrode (within the volume of the electrode). Further, in embodiments of the present invention, electrodeposition techniques may be used to fabricate high surface area structures; it is believed that this may advantageously decrease catalytic polarization losses. Yet further, embodiments of the present invention may enable device architecture stacking for balance of stack improvements; for example, layers are generally not terminated at the current collector deposition step. Still further, electrodeposition processes may advantageously be used to seal joints within the balance of stack.

In the fuel cells 10, 10', 10", 10'", 10"" described hereinbelow, current collectors 20, when initially deposited as conductive members 20', may be used (if subsequent electrodeposition processes are used) as electrodes for the electrodeposition of active elements of the fuel cells, i.e. anode 16, cathode 18 and electrolyte 14, 14', 14". Then these electrodes for the electrodeposition of active elements may later advantageously serve the dual purpose of becoming current collectors for anode 16 and/or cathode 18.

Referring now to FIG. 1A, an embodiment of the fuel cell of the present invention is designated generally as 10. Fuel cell 10 may include one or more fuel cell assemblies 12. Fuel cell assembly 12 has an electrolyte 14; an anode 16 disposed on one side of the electrolyte 14; and a cathode 18 disposed on the same or the other side of the electrolyte 14.

Figure 2:
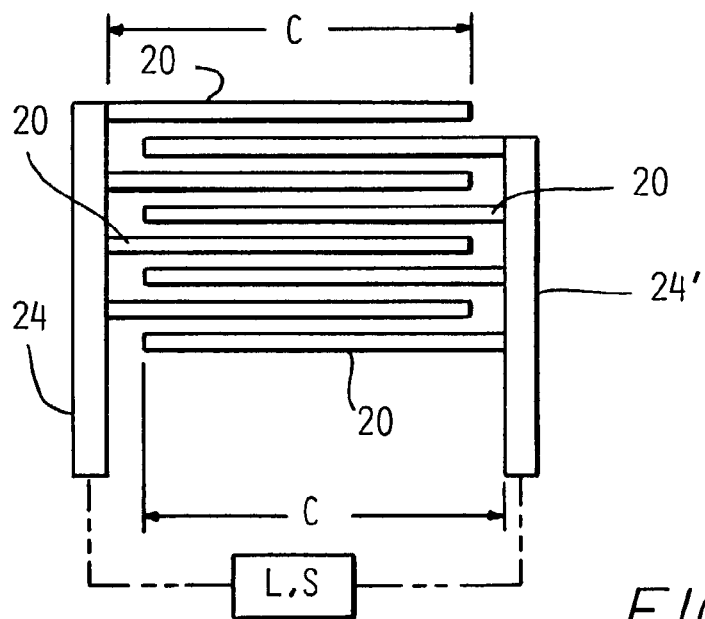
FIG. 2 is a schematic top view of embodiments of the present invention, showing anode and cathode current collectors.
Figure 7A:
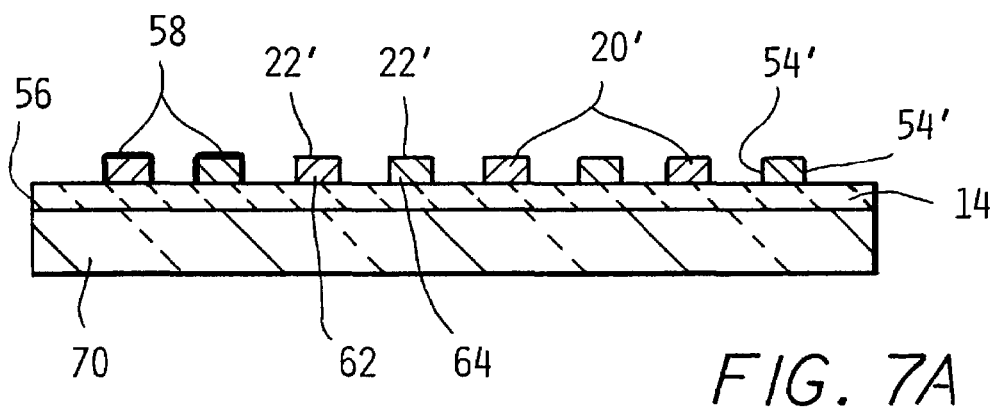
FIG. 7A is a cross-sectional side view of a first step of a non-limitative method of making an embodiment of the present invention, showing conductive members on an electrolyte.
Figure 7B:
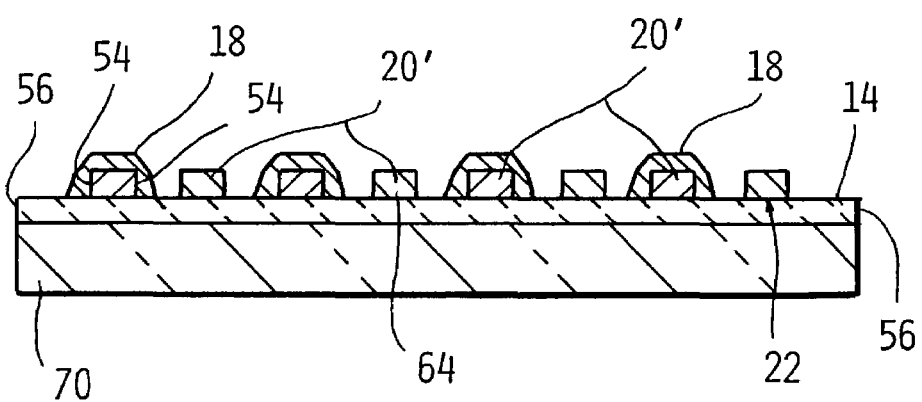
FIG. 7B is a cross-sectional side view of a second step of a non-limitative method of making an embodiment of the present invention, showing deposition of anode or cathode.
Figure 7C:
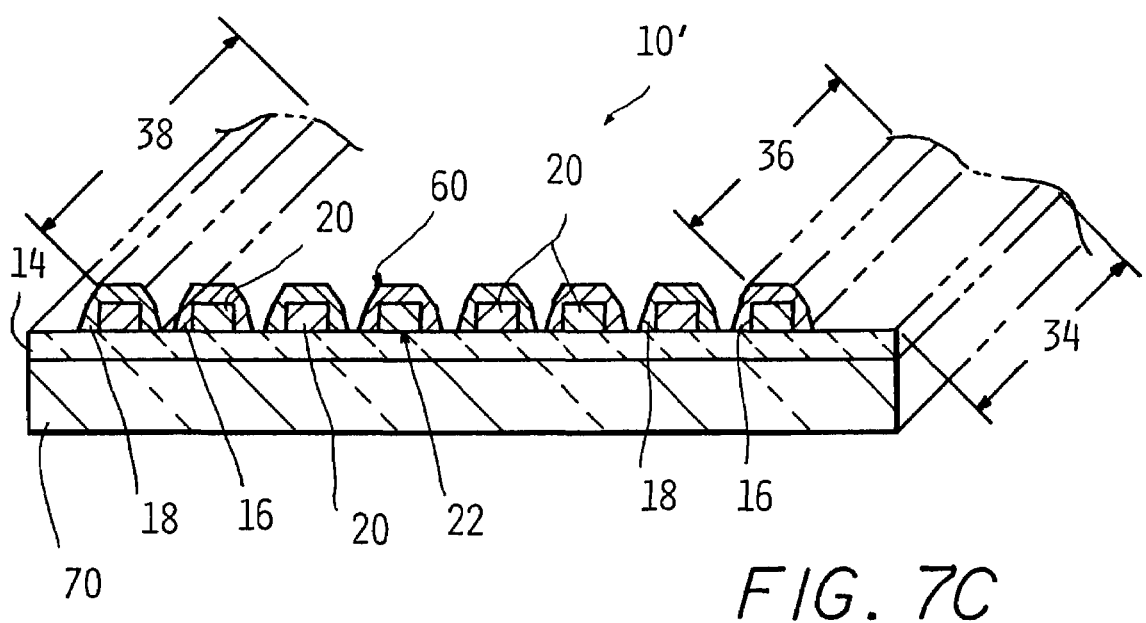
FIG. 7C is a cross-sectional side view of a third step of a non-limitative method of making an embodiment of the present invention, showing deposition of cathode or anode, and also showing (in phantom) lengths of anode, cathode and electrolyte.

Fuel cell 10 has one or more current collectors 20, each of the current collectors 20 substantially embedded within, and continuously extending substantially the respective length of the electrolyte 14, anode 16 and/or cathode 18. In, for example, FIG. 1A, the lengths of each of electrolyte 14, anode 16 and cathode 18 are normal to the plane of the page. In FIG. 7C, the lengths of electrolyte 14, anode 16 and cathode 18 are shown in phantom, and are designated 34, 36 and 38, respectively. In FIG. 2, an illustrative representation of the length of current collectors 20 is designated C. FIG. 2 further shows connecting members 24, 24' operatively attached to current collectors 20, for connecting the fuel cell 10 to an electrical load L and/or an electrical storage device S. Connecting members 24, 24' may be formed from any suitable material. In an embodiment, members 24, 24' have as a main component thereof an electrically conductive material. Some suitable examples of such an electrically conductive material include, but are not limited to at least one of silver, palladium, platinum, gold, titanium, tantalum, chromium, iron, nickel, carbon, and mixtures thereof.

The electrical load L may include many devices, including but not limited to any or all of computers, portable electronic appliances (e.g. portable digital assistants (PDAs), portable power tools, etc.), and communication devices, portable or otherwise, both consumer and military. The electrical storage device S may include, as non-limitative examples, any or all of capacitors, batteries, and power conditioning devices. Some exemplary power conditioning devices include uninterruptible power supplies, DC/AC converters, DC voltage converters, voltage regulators, current limiters, etc.

It is also contemplated that the fuel cell 10, 10', 10", 10'", 10"" of the present invention may, in some instances, be suitable for use in the transportation industry, e.g. to power automobiles, and in the utilities industry, e.g. within power plants.

As defined herein, current collectors 20 are electrically conductive members 20' which have become current collectors 20 by their having an electrode (anode 16 or cathode 18) placed in contact with them. Some examples of conductive members 20' are shown in FIGS. 1A, 3A–3D, 7A and 7B.

Figure 3A:
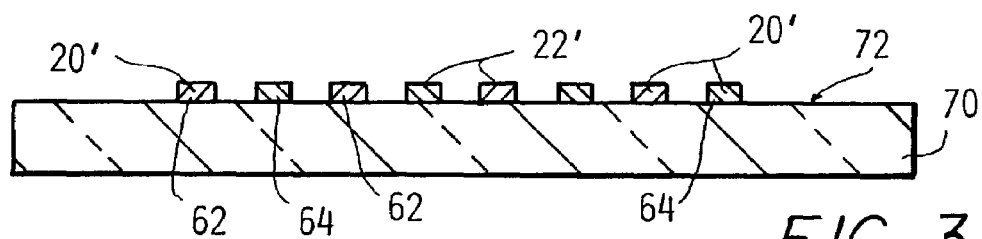
FIG. 3A is a cross-sectional side view of a first step of a non-limitative method of making an embodiment of the present invention, showing conductive members on a substrate.
Figure 3B:
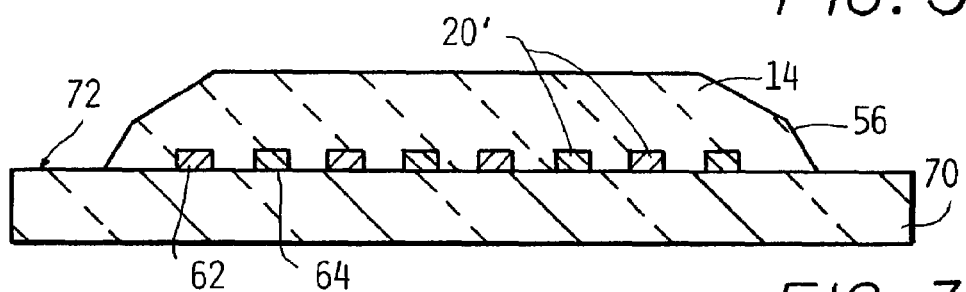
FIG. 3B is a cross-sectional side view of a second step of a non-limitative method of making an embodiment of the present invention, showing deposition of an electrolyte.
Figure 3C:
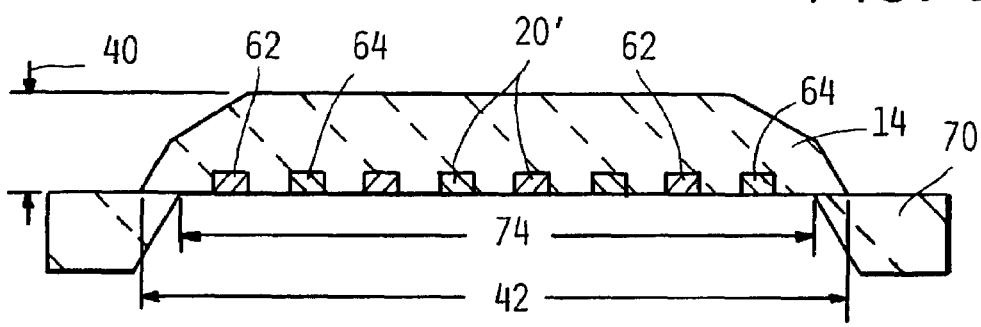
FIG. 3C is a cross-sectional side view of a third step of a non-limitative method of making an embodiment of the present invention, showing selective removal of the substrate.

FIGS. 1A, 4–6 and 7C show current collectors 20 substantially embedded within anode 16 and cathode 18. FIG. 3E shows the current collectors 20 substantially embedded within electrolyte 14.

As shown in FIGS. 1A, 4–6 and 7C, each of the current collectors 20 is substantially embedded within at least one of the anode 16 and the cathode 18. In these embodiments, each of the current collectors 20 includes a discrete exposed surface 22 continuously extending substantially the length of the respective anode 16 or cathode 18. The exposed surface 22 is covered by the electrolyte 14.

As shown in FIG. 3E, each of the current collectors 20 is substantially embedded within the electrolyte 14. In this embodiment, each of the current collectors 20 has a discrete exposed surface 23 continuously extending substantially the length of the electrolyte 14. The exposed surface 23 is covered by either the anode 16 or the cathode 18. It is to be understood that current collector(s) 20/conductive members 20' may be any suitable shape, configuration and size, as desired and/or necessitated by a particular end use. Further, exposed surface 22, 23 may also be any suitable shape, configuration and size, as desired and/or necessitated by a particular end use.

Figure 8:
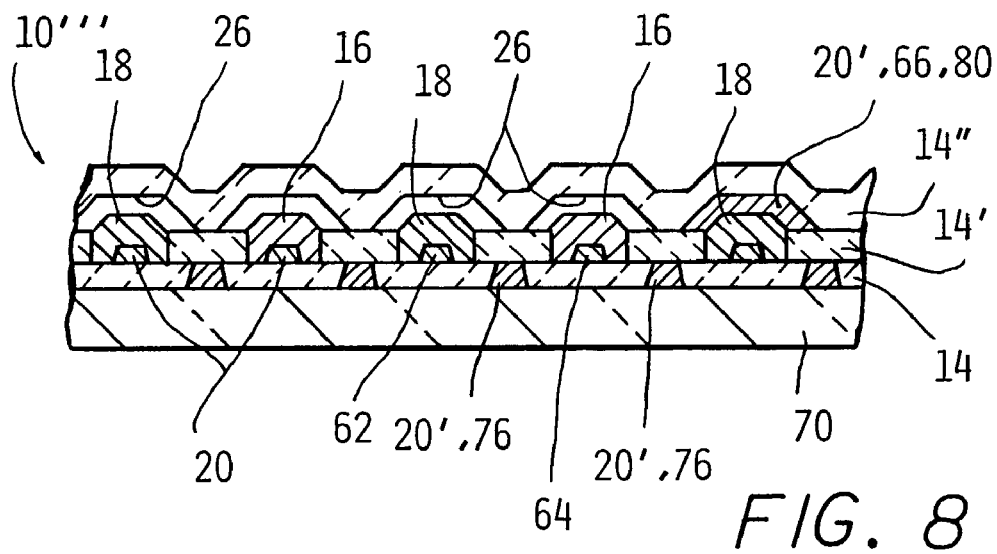
FIG. 8 is a cutaway, cross-sectional side view of an alternate embodiment of the present invention, showing a substrate supported dual chamber fuel cell.

Referring to FIGS. 1A, 3E, 7C, 8 and 9, in any embodiment of the fuel cell 10, 10', 10", 10'", 10"" of the present invention, at least some of the current collectors 20 and/or conductive members 20' may optionally be selectively removed from the electrolyte 14, anode 16 and/or cathode 18 to provide at least one gas flow channel 26 (FIGS. 1A and 8) to create a path(s) for gas (air and/or fuel) to enter and exhaust the fuel cell 10, 10', 10", 10'", 10"". Gas flow channels 26 may advantageously increase the active surface area exposed to oxidants/air and reactants/fuel. In FIG. 1A, although only two gas flow channels 26 are shown, one above anode 16 for reactants, and one above cathode 18 for oxidants, it may be desirable to remove more or all conductive members 20' within electrolyte layer 14" to provide further gas flow channels 26 (as shown in FIG. 8).

It is to be understood that the current collectors 20/conductive members 20' may be formed from any suitable conductive material. Conductive materials may be divided into conductive metals, conductive oxides, conductive cermets, and conductive composites. It may be desirable, and in some embodiments of the present invention, preferable that the current collectors 20/conductive members 20' be formed from a material which is able to withstand the conditions (temperatures) of anode 16/electrolyte 14/cathode 18 sintering (or annealing).

In an embodiment, the conductive material is at least one of gold, aluminum, platinum, copper, nickel, ruthenium, ruthenium oxide, silver, palladium, titanium, tantalum, chromium, $La_xSr_yMnO_{3-\delta}$, $La_xSr_yCrO_{3-\delta}$, conductive composites, conductive cermets, iron, carbon, alloys of any of the above, and mixtures thereof.

It is to be further understood that the conductive composites may be formed from any suitable material. In an embodiment, the conductive composites include at least one of $La_xSr_yMnO_{3-\delta}+M$, $La_xSr_yCrO_{3-\delta}+M$, and mixtures thereof, wherein M is at least one metal.

Some non-limitative materials which may in some instances be more suitable for current collectors 20 for anodes 16 include platinum, gold, palladium, stainless steel and plated stainless steel, alloys thereof, and mixtures thereof.

Some non-limitative materials which may in some instances be more suitable for current collectors 20 for cathodes 18 include platinum, gold, silver, ruthenium, alloys thereof, and mixtures thereof.

Some non-limitative materials which may in some instances be more suitable for conductive members 20' which become sacrificial layers (i.e. are removed to provide gas flow channel(s) 26, and/or are removed to render a predetermined desired fuel cell 10 architecture) include aluminum, nickel, copper, carbon, alloys thereof, and mixtures thereof. One non-limiting example of a layer which may in certain instances be deemed sacrificial is designated as 30 in FIG. 1A.

It is to be understood that the fuel cell 10, 10', 10", 10''', 10'''' may be one of solid oxide fuel cells, proton conducting ceramic fuel cells, alkaline fuel cells, Polymer Electrolyte Membrane (PEM) fuel cells, molten carbonate fuel cells, solid acid fuel cells, and Direct Methanol PEM fuel cells. In an embodiment of the present invention, fuel cell 10, 10', 10", 10''', 10'''' is a solid oxide fuel cell.

The electrolyte 14 may be formed from any suitable material. In an embodiment of the present invention, electrolyte 14 is at least one of oxygen ion conducting membranes, proton conductors, carbonate ($CO_3^{2-}$) conductors, $OH^-$ conductors, and mixtures thereof.

In an alternate embodiment, electrolyte 14 is at least one of cubic fluorite structures, doped cubic fluorites, proton-exchange polymers, proton-exchange ceramics, and mixtures thereof. In a further alternate embodiment, electrolyte 14 is at least one of yttria-stabilized zirconia, samarium doped-ceria, gadolinium doped-ceria, $La_aSr_bGa_cMg_dO_{3-\delta}$, and mixtures thereof.

It is to be understood that the anode 16 and cathode 18 may be formed from any suitable material, as desired and/or necessitated by a particular end use. In an embodiment, each of the anode 16 and cathode 18 is at least one of metals, ceramics and cermets.

In an embodiment of the present invention, some non-limiting examples of metals which may be suitable for the anode 16 include at least one of nickel, platinum and mixtures thereof. Some non-limiting examples of ceramics which may be suitable for the anode 16 include at least one of $Ce_xSm_yO_{2-\delta}$, $Ce_xGd_yO_{2-\delta}$, $La_xSr_yCr_zO_{3-\delta}$, and mixtures thereof. Some non-limiting examples of cermets which may be suitable for the anode 16 include at least one of Ni—YSZ, Cu—YSZ, Ni—SDC, Ni-GDC, Cu—SDC, Cu-GDC, and mixtures thereof.

In an embodiment of the present invention, some non-limiting examples of metals which may be suitable for the cathode 18 include at least one of silver, platinum and mixtures thereof. Some non-limiting examples of ceramics which may be suitable for the cathode 18 include at least one of $Sm_xSr_yCoO_{3-\delta}$, $Ba_xLa_yCoO_{3-\delta}$, $Gd_xSr_yCoO_{3-\delta}$, and mixtures thereof.

In any of the embodiments described herein, the gas to which fuel cell 10, 10', 10", 10''', 10'''' is exposed includes reactants and/or oxidants and/or mixtures thereof. In an embodiment, the reactants are fuels, and the oxidants are one of oxygen, air, and mixtures thereof.

It is to be understood that any suitable fuel/reactant may be used with the fuel cell 10, 10', 10", 10''', 10'''' of the present invention. In an embodiment, the fuel/reactant is selected from at least one of methane, ethane, propane, butane, pentane, methanol, ethanol, higher straight chain or mixed hydrocarbons, for example, natural gas or gasoline (low sulfur hydrocarbons may be desirable, e.g. low sulfur gasoline, low sulfur kerosene, low sulfur diesel), and mixtures thereof. In an alternate embodiment, the fuel/reactant is selected from the group consisting of butane, propane, methane, pentane, and mixtures thereof. Suitable fuels may be chosen for their suitability for internal and/or direct reformation, suitable vapor pressure within the operating temperature range of interest, and like parameters.

In an embodiment of the present invention, the fuel cell 10 is a single chamber fuel cell. FIG. 3E is an example of a single chamber fuel cell. In embodiments of single chamber fuel cells, the gas is a mixture of reactants and oxidants.

In an alternate embodiment of the present invention, the fuel cell 10 is a dual chamber fuel cell. FIG. 1A is an example of a dual chamber fuel cell. It is to be understood that the embodiment of FIG. 1A could be modified to be a single chamber fuel cell. In embodiments of dual chamber fuel cells, the gas is one of reactants and oxidants. Oxidants are carried to the cathode 18 of each of the fuel cell assemblies, and reactants are carried to the anode 16 of each of the fuel cell assemblies.

Figure 3D:
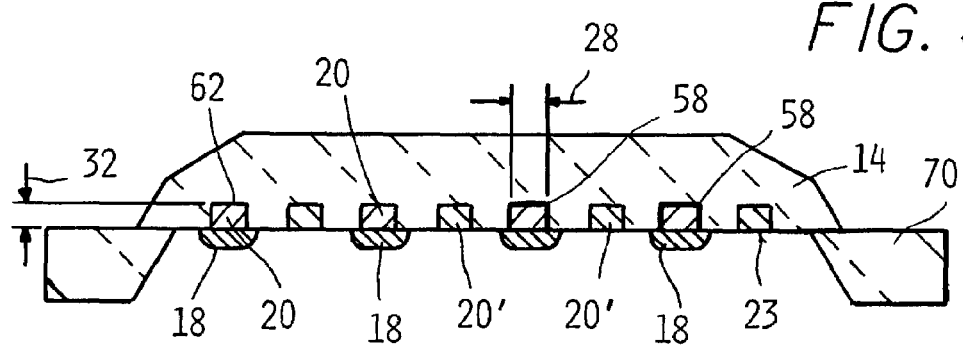
FIG. 3D is a cross-sectional side view of a fourth step of a non-limitative method of making an embodiment of the present invention, showing deposition of anode or cathode.
Figure 3E:
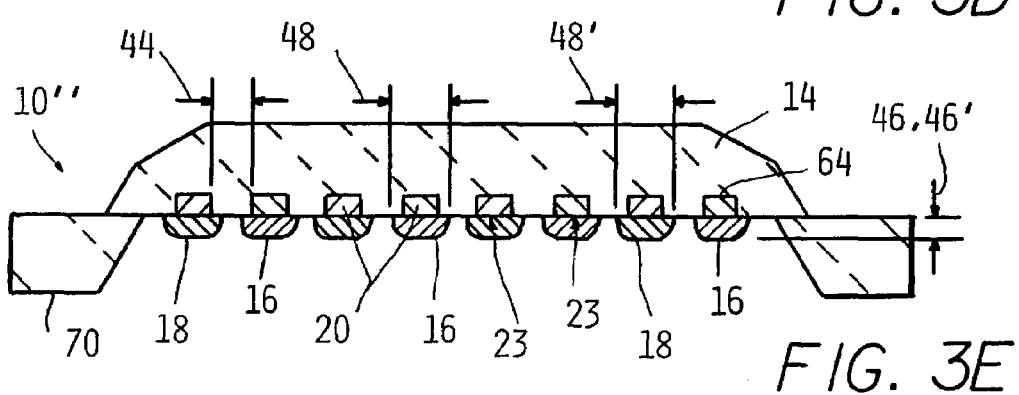
FIG. 3E is a cross-sectional side view of a fifth step of a non-limitative method of making an embodiment of the present invention, showing deposition of cathode or anode.

Referring now to FIG. 3D, each of the plurality of current collectors 20 has a width 28. In an embodiment, width 28 may range between about 1 micron and about 500 microns. In an alternate embodiment, the current collector width 28 may range between about 5 microns and about 100 microns.

Each of the plurality of current collectors 20 has a thickness 32. In an embodiment, thickness 32 may range between about 0.1 micron and about 100 microns. In an alternate embodiment, the current collector thickness 32 may range between about 1 micron and about 10 microns.

If the current collectors 20/conductive members 20' are designed for use To as a sacrificial layer 30, to provide a gas flow channel(s) 26 and/or to render a predetermined desired fuel cell 10 architecture, it may be desirable that those current collectors 20/conductive members 20' each have a width 28 ranging between about 40 microns and about 200 microns. It may further be desirable that those current collectors 20/conductive members 20' each have a thickness 32 ranging between about 0.1 microns and about 5 microns.

Referring again to FIGS. 2 and 7C, in an embodiment of the present invention, the current collector length C, the anode length 36, the cathode length 38, and the electrolyte length 34 each range between about 0.01 cm and about 12 cm. In an alternate embodiment, the current collector length C, the anode length 36, the cathode length 38, and the electrolyte length 34 each range between about 5 mm and about 25 mm.

Referring now to FIG. 3C, in an embodiment of the present invention, electrolyte 14 may have a thickness 40 ranging between about 3 microns and about 1500 microns. In an alternate embodiment, the electrolyte thickness 40 may range between about 15 microns and about 300 microns.

Referring yet to FIG. 3C, in an embodiment of the present invention, electrolyte 14 may have an overall width 42 ranging between about 0.01 cm and about 12 cm. In an alternate embodiment, the electrolyte overall width 42 may range between about 5 mm and about 25 mm.

Referring now to FIG. 3E, the width between adjacent current collectors 20 is designated 44, and the thickness of the anodes is designated 46, and the thickness of the cathodes is designated 46'. In an embodiment of the present invention, the anode thickness 46 and the cathode thickness 46' are each less than about half the width 44 between adjacent current collectors 20.

In an embodiment of the present invention, the width 44 between adjacent current collectors ranges between about 1 micron and about 1500 microns. In an alternate embodiment of the present invention, the width 44 between adjacent current collectors ranges between about 3 microns and about 500 microns. In another alternate embodiment of the present invention, the width 44 between adjacent current collectors ranges between about 5 microns and about 300 microns. In yet another alternate embodiment of the present invention, the width 44 between adjacent current collectors ranges between about 15 microns and about 100 microns.

Referring yet to FIG. 3E, anodes 16 have a width 48, and cathodes 18 have a width 48'. In an embodiment of the present invention, anode width 48 and cathode width 48' are each greater than the current collector width 28 (FIG. 3D). It is desirable that widths 48, 48' of embodiments of the present invention be chosen such that anodes 16 are not in contact with cathodes 18.

Figure 4:
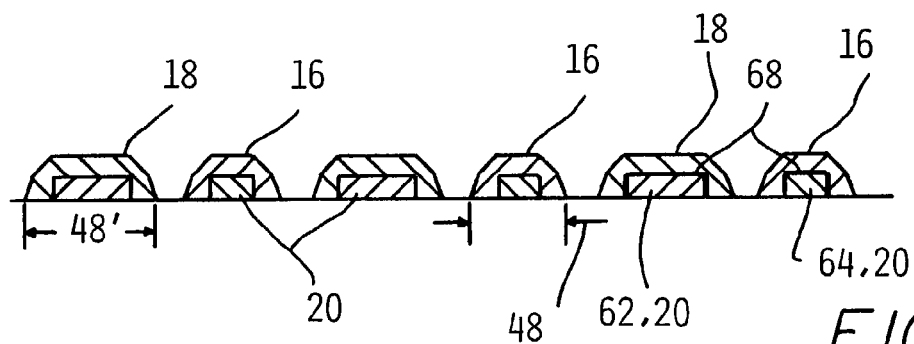
FIG. 4 is a cross-sectional side view of an alternate embodiment of the present invention, showing one example of a ratio of anode width to cathode width.
Figure 5:
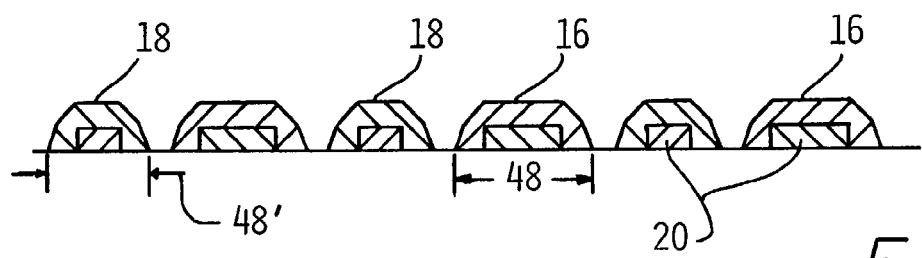
FIG. 5 is a cross-sectional side view of another alternate embodiment of the present invention, showing an alternate example of a ratio of anode width to cathode width.

Referring now to FIGS. 4 and 5, in an optional embodiment of the present invention, the ratio of anode width 48 to cathode width 48' varies. As illustrated in FIG. 4, cathode width 48' may be larger than anode width 48. As illustrated in FIG. 5, anode width 48 may be larger than cathode width 48'. The activity of anode 16 and cathode 18 may thus be different, and can be selectively adjusted to a predetermined activity by variation of the ratio.

Figure 6:
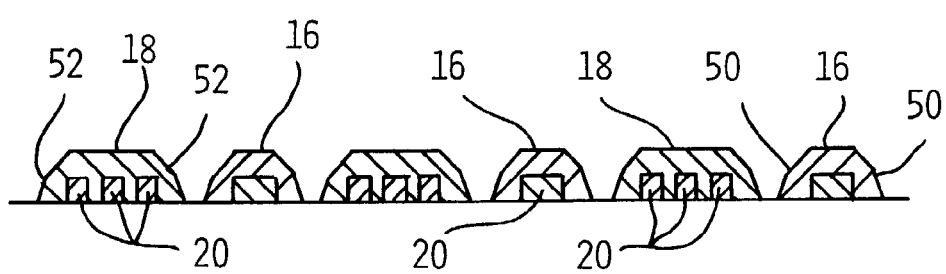
FIG. 6 is a cross-sectional side view of an embodiment of the present invention, showing more than one current collector within an electrode.

Referring now to FIG. 6, in an optional embodiment of the present invention, more than one current collector 20 is substantially embedded within the electrolyte 14, anode 16 and/or cathode 18. In the non-limiting example shown in FIG. 6, cathode 18 has three current collectors 20 substantially embedded therewithin.

It is to be understood that the Figures selected to depict various widths, lengths and other dimensions were selected for illustrative purposes, and the recited values for the various dimensions are meant to apply to any of the embodiments disclosed herein and to any or all of the Figures discussed herein.

It is to be understood that the side walls of anode 16, cathode 18, electrolyte 14, and current collector 20/conductive member 20' may be any suitable size, shape or configuration. In an embodiment of the present invention, the anode 16, cathode 18, electrolyte 14 and current collector 20/conductive member 20' may optionally have outwardly angularly extending opposed side walls. In FIG. 6, anode 16 is shown with outwardly angularly extending opposed side walls 50; and cathode 18 is shown with outwardly angularly extending opposed side walls 52. In FIGS. 1A and 3B, electrolyte 14 is shown with outwardly angularly extending opposed side walls 56; and in FIG. 1A, current collector 20/conductive member 20' is shown with outwardly angularly extending opposed side walls 54, 54', respectively.

In an alternate embodiment of the present invention, the anode 16, cathode 18, electrolyte 14 and current collector 20/conductive member 20' may optionally have substantially vertically extending opposed side walls. In FIG. 1A, anode 16 is shown with substantially vertically extending opposed side walls 50; and cathode 18 is shown with substantially vertically extending opposed side walls 52. In FIGS. 7A and 7B, electrolyte 14 is shown with substantially vertically extending opposed side walls 56; and current collectors 20/conductive members 20' are shown with substantially vertically extending opposed side walls 54, 54', respectively.

Referring now to FIGS. 3D and 7A, an embodiment of the present invention optionally further includes an adhesion layer 58 substantially surrounding each of the plurality of current collectors 20/conductive members 20'. Only a few current collectors 20/conductive members 20' are shown with an adhesion layer 58 for illustrative purposes; however, it is to be understood that if an adhesion layer 58 were applied, it would generally, though not necessarily, be applied to an entire layer of current collectors 20/conductive members 20'. An adhesion layer 58 may be desirable if the adhesion between the material(s) forming the current collector 20/conductive member 20' and subsequently applied layers (e.g. anode 16, cathode 18, electrolyte 14) is not as high as may be desirable in certain instances. The thickness of adhesion layer 58 is relatively thin, and ranges between about 1 nm and about 200 nm. Some examples of materials suitable for the adhesion layer 58 include, but are not limited to at least one of tantalum, chromium, titanium, and mixtures thereof.

Referring now to FIG. 7C, a fuel cell conductor 60 of an embodiment of the present invention includes a body (which is an electrolyte 14, anode 16, and/or cathode 18) having a length 34, 36, 38, respectively, and a current collector 20 substantially embedded within, and continuously extending the length 34, 36, 38 of the body. It is to be understood that the term "conductor," as used in the sense of conductor 60, is meant to include a conductor of ions (as in case of electrolyte 14) and/or electrons (as in the case of anode 16 or cathode 18).

Referring now to FIG. 7A, a method of making a fuel cell 10' includes the step of depositing a first 62 and a second 64 conductive member 20' on an electrolyte layer 14, wherein the first 62 and second 64 conductive members 20' each have an exposed surface 22', the exposed surface 22' being surface not in contact with the electrolyte 14.

Referring now to FIG. 7B, the method of making fuel cell 10' further includes the step of depositing either an anode layer 16 or a cathode layer 18 on the exposed surface 22' of the first conductive member 62, wherein the first conductive member 62 is a current collector 20 for the applied electrode layer. The non-limiting example shown in FIG. 7B shows a cathode layer 18 being deposited on first conductive member 62. It is to be understood that an anode layer 16 may be selected for deposit on first conductive members 62.

Referring again to FIG. 7C, the method of making fuel cell 10' further includes the step of depositing the other of the anode layer 16 and the cathode layer 18 on the exposed surface 22' of the second conductive member 64, wherein the second conductive member 64 is a current collector 20 for the applied electrode layer. The non-limiting example shown in FIG. 7C shows an anode layer 16 being deposited on second conductive member 64. It is to be understood that if anode layer 16 is selected for deposit on first conductive members 62, a cathode layer 18 should be deposited on second conductive members 64.

It is to be understood that the deposition of the anode layer 16 and cathode layer 18 may be accomplished by any suitable process. In an embodiment of the present invention, this deposition is accomplished by electrodeposition, Chemical Vapor Deposition (CVD), Physical Vapor Deposition (PVD), spin coating, atomic deposition, and/or the like. In a further embodiment of the present invention, this deposition is accomplished by electrolytic deposition and/or electrophoretic deposition.

Referring now to FIG. 1A, a method of making fuel cell 10, 10' includes the steps hereinabove, and may further include the step of depositing a plurality of third conductive members 66 on a second electrolyte layer 14' and at least some of the anode layers 16 and the cathode layers 18. The non-limiting method may further include the step of depositing a further/third electrolyte layer 14" over the third conductive members 66. Although electrolyte layers 14' and 14" are shown as two separate layers, it is to be understood that electrolyte layers 14', 14" may be combined into one single electrolyte layer.

The method of making fuel cell 10, 10' may further optionally include the step of selectively removing at least one of the plurality of first 62, second 64 and third 66 conductive members 20' to provide at least one gas flow channel 26. It is to be understood that this selective removal may be accomplished by any suitable method. However, in an embodiment, the selective removal step is accomplished by etching.

It is to be understood that deposition of the electrolyte layer 14, the second electrolyte layer 14' and the third electrolyte layer 14" may be accomplished by any suitable method. In an embodiment, this method is at least one of electrodeposition, Chemical Vapor Deposition (CVD), Physical Vapor Deposition (PVD), spin coating, atomic deposition, and the like. In a further embodiment, the electrolyte 14, 14', 14" layers are deposited by electrophoretic deposition, electrolytic deposition, cathodic electrolytic deposition, and/or combinations thereof. In a further alternate embodiment, the electrolyte 14, 14', 14" layers are deposited by electrophoretic deposition.

Electrodeposition processes are advantageous in that selective conductive members 20'/current collectors 20 allow deposition of patterned layers and/or three-dimensional encapsulation of the conductive members 20'/current collectors 20 by virtue of charge and potential. As such, no etching is required to control the shape or structure of the anode 16, cathode 18, and/or electrolyte 14, 14', 14".

Referring now to FIG. 4, a method of making fuel cell 10, 10' may further optionally include the step of depositing a protective layer 68 on the first 62 and second 64 conductive members 20' before deposition of either the anode 16 or the cathode 18, wherein the protective layer 68 may advantageously render the first 62 and second 64 conductive members more stable at high temperatures.

If a protective layer 68 is desired and/or necessitated by a particular end use, it should be a relatively thin layer, e.g. on the order of greater than about 1 nm. It is to be understood that the protective layer 68 may be formed from any suitable material which is passive/inert and not a poison for catalysis. In an embodiment, protective layer 68 includes at least one of ceramics, aluminum, titanium, inert oxide layers, and mixtures thereof.

A protective layer(s) 68 may be useful for preventing undesirable agglomeration (discontinuity) of current collectors 20. The protective layer 68 may not be necessary if the material from which the current collector 20 is formed is sufficiently stable at high temperatures within its environment, e.g. substantially embedded within a ceramic anode 16 or cathode 18 material.

Referring now to FIG. 3A, a method of making fuel cell 10" includes the step of depositing a plurality of first 62 and second 64 conductive members 20' on a substrate 70. The first 62 and second 64 conductive members each have a first exposed surface 22', the first exposed surface 22' being surface not in contact with the substrate 70. Substrate 70 has an exposed area 72, which is not in contact with the plurality of first 62 and second 64 conductive members 20'. It is to be understood that any suitable material for substrate 70 may be chosen. In an embodiment, the substrate 70 is formed from at least one of single crystal silicon, polycrystalline silicon, silicon oxide containing dielectric substrates, alumina, sapphire, ceramic, and mixtures thereof. In an alternate embodiment of the present invention, single crystal silicon is a substrate 70 of choice.

Referring now to FIG. 3B, the method of making fuel cell 10" may further include the step of depositing an electrolyte layer 14 on the first exposed surfaces 22' of the first 62 and second 64 conductive members 20' and on the substrate exposed area 72.

Referring now to FIG. 3C, the method may further include the step of removing a predetermined amount of substrate 70 so as to expose a discrete area 74 including a repeating pattern of first conductive member 62, electrolyte 14, second conductive member 64. Each of the first 62 and second 64 conductive members 20' have a second exposed surface 23, the second exposed surface 23 being surface from which substrate 70 has been removed. It is to be understood that the substrate 70 removal step may be accomplished by any suitable process. In an embodiment, the substrate 70 removing step is accomplished by etching.

Referring now to FIG. 3D, the method may further include the step of depositing one of an anode layer 16 and a cathode layer 18 on the second exposed surface 23 of the first conductive member 62, wherein the first conductive member 62 is a current collector for the deposited electrode. A non-limitative example in FIG. 3D depicts a cathode layer 18 deposited on each of first conductive members 62.

Referring now to FIG. 3E, the method may further include the step of depositing the other of a cathode layer 18 and an anode layer 16 on the second exposed surface 23 of the second conductive member 64, wherein the second conductive member 64 is a current collector for the deposited electrode. A non-limitative example in FIG. 3E depicts an anode layer 16 deposited on each of second conductive members 64.

It is to be understood that, in embodiments of the fuel cell 10, 10', 10", 10''', 10'''' of the present invention, the deposition of the various layers (electrolytes 14, 14', 14", anodes 16, cathodes 18) may be by any suitable processes, including but not limited to electrodeposition, Chemical Vapor Deposition (CVD), Physical Vapor Deposition (PVD), spin coating, atomic deposition, and the like. In an embodiment, the electrolyte 14 is deposited by electrophoretic deposition, and the anode 16/cathode 18 is deposited by electrolytic deposition. If non-electro deposition processes are used, e.g. CVD, atomic deposition, PVD, spin coating, steps for masking and patterning should be added to the methods of the present invention.

It is to be understood that the conductive members 20' may be deposited by any suitable process, including but not limited to non-electrodeposition processes (e.g. PVD) and the like. After deposition, the conductive members 20' may be formed by microlithography, nano imprinting, and the like.

Referring again to FIG. 1A, an alternate method of making a fuel cell 10 includes the step of depositing a first plurality 76 of conductive members 20' on either an anode surface 16 or a cathode surface 18.

The anode 16/cathode 18 support surface 88 (upon which the first plurality 76 of conductive members 20' is placed) is itself deposited on a non-embedded conductive member 84'. Non-embedded conductive member 84' may be totally removed, for example by etching, to expose anode 16/cathode 18 support surface 88 to reactants and/or oxidants. If member 84' is completely removed, the first plurality 76 of conductive members 20' become current collectors 20 for anode 16/cathode 18 support surface 88.

Alternately, as shown in FIG. 1B, member 84' may be partially etched to provide passages 86 for entry of reactants and/or oxidants. Such partial etching also renders non-embedded current collectors 84 to collect current for anode 16/cathode 18 support surface 88.

Referring back to FIG. 1A, the first plurality 76 of conductive members each has an exposed surface 21' which is surface not in contact with the anode 16/cathode 18 support surface 88. The support surface 88 has an exposed area 78 which is area not in contact with the plurality 76 of conductive members 20'.

A first electrolyte layer 14 is deposited on the exposed surfaces 21' of the plurality 76 of conductive members 20' and on the exposed area 78. The first electrolyte layer 14 may be planarized (as shown) by any suitable process, such as for example, chemical mechanical polishing (CMP). Alternately, the first electrolyte layer 14 may be left substantially as deposited (e.g., see FIG. 9). A plurality of first 62 and second 64 conductive members 20' is deposited on the first electrolyte layer 14.

Either an anode layer 16 or a cathode layer 18 is deposited on the exposed surface 22' of the first conductive member 62. The other of a cathode layer 28 or an anode layer 16 is deposited on the exposed surface 22' of the second conductive member 64.

The alternate method of making fuel cell 10 of the present invention may further include the step of depositing a second electrolyte layer 14' between adjacent anode 16 and cathode 18 layers. A second plurality 80 of conductive members 20' may then be deposited on at least some of the anode layers 16 and the cathode layers 18, wherein each of the second plurality 80 of conductive members 20' has an exposed surface 82, the exposed surface 82 being surface not in contact with either the anode layers 16 or the cathode layers 18. A third electrolyte layer 14" may then be deposited over the second plurality 80 of conductive members 20'.

Referring now to FIG. 8, an alternate embodiment of the fuel cell of the present invention is designated generally as 10'''. Fuel cell 10''' is a substrate 70 supported dual chamber fuel cell. Fuel cell 10''' is formed by the methods as set forth above relating to FIG. 1A, except that the first plurality 76 of conductive members 20' is deposited on substrate 70 (as opposed to anode 16/cathode 18 support surface 88 as shown in FIG. 1A). The fuel cell 10''' of FIG. 8 may be suitable if a dual chamber fuel cell having enclosed gas flow passages 26 is desired, without any exposed passages (such as exposed passages 86 in FIG. 1B) for entry of reactants and/or oxidants.

Figure 9:
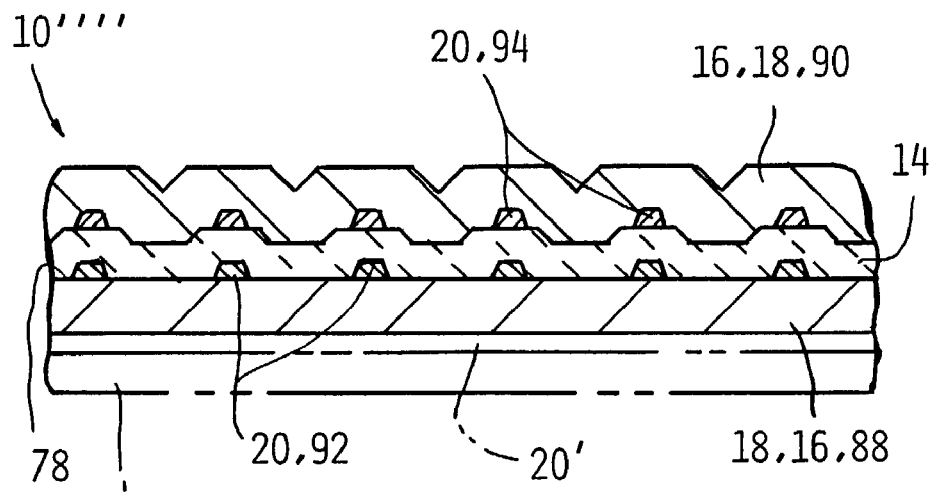
FIG. 9 is a cutaway, cross-sectional side view of an alternate embodiment of a dual chamber fuel cell.

Referring now to FIG. 9, an alternate embodiment of the fuel cell of the present invention is designated generally as 10''''. Fuel cell 10'''' is an alternate embodiment of a dual chamber fuel cell. Fuel cell 10'''' may be formed by the following method. A conductive member 20' is deposited on substrate 70. Anode 16/cathode 18 support surface 88 is then deposited on conductive member 20'. A first plurality 92 of current collectors 20 is deposited on anode 16/cathode 18 support surface 88. An electrolyte layer 14 is deposited over the first plurality 92 of current collectors 20 and over exposed surface 78 of anode 16/cathode 18 support surface 88. At this point, electrolyte layer 14 may optionally be planarized by any suitable method, such as for example, chemical mechanical polishing (CMP), to render a substantially planar surface as in FIG. 1A at the interface between electrolyte layer 14 and electrolyte layer 14'. A second plurality 94 of current collectors 20/conductive members 20' is deposited on electrolyte layer 14. An electrode layer 90 counter to anode 16/cathode 18 support surface 88 is deposited over the second plurality 94 of current collectors 20 and over electrolyte layer 14. For example, if layer 88 is an anode 16, then layer 90 is a cathode 18, and vice versa. Then substrate 70 and conductive member 20' covering substrate 70 may be partially or fully removed, for example by etching, to expose surface 88 to reactants and/or oxidants. In an embodiment of fuel cell 10'''', substrate 70 and conductive member 20' thereon are fully removed to expose the entire lower surface of anode 16/cathode 18 support surface 88 to reactants and/or oxidants.

The dual chamber fuel cell'''' of FIG. 9 may be desirable in that it is a simple dual chamber fuel cell, which may advantageously be formed by the relatively simple method described above.

Figure 10:
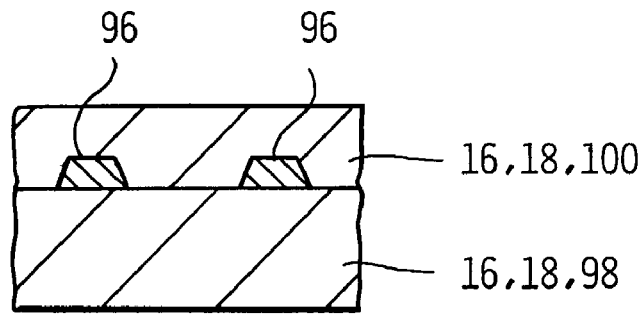
FIG. 10 is a cross-sectional view of an embodiment of the present invention, showing an electrode (anode or cathode) having a current collector completely embedded therein.

Referring now to FIG. 10, an alternate current collector, desirably for use in thin film fuel cells, is designated as 96. Thin film current collector 96 is completely embedded within either an anode 16 and/or a cathode 18. A method for forming current collector 96 includes the step of depositing a first layer 98 of an electrode (anode 16 or cathode 18). One or more thin film current collectors 96 are then deposited over the electrode first layer 98. The current collectors 96 may be formed as one or more thin fingers as shown, or may be deposited in any configuration, for example, in a net-like configuration. A second layer 100 of the electrode (i.e. if first layer 98 is an anode 16, then second layer 100 is also an anode 16, and if first layer 98 is a cathode 18, then second layer 100 is also a cathode 18) is deposited over current collector(s) 96 and over first layer 98.

The completely embedded current collector(s) 96 of the embodiment of FIG. 10 may be desirable in that the surrounding layers of anode 16 or cathode 18 may advantageously improve the stability of current collector(s) 96 and prevent undesirable agglomeration of current collector(s) 96, thereby rendering a high efficiency current collector(s) 96, and/or prolonging the high efficiency life of the electrode 16, 18 within which it is placed.

It is to be understood that the deposition, patterning and/or removing processes of the embodiments shown in FIGS. 8–10 may be accomplished by any of the processes and/or alternate processes as set forth hereinabove in relation to the embodiments of FIGS. 1A–7C. It is to be further understood that the sizes, shapes, configurations, dimensions, etc. of various components of the embodiments shown in FIGS. 8–10 may be as set forth hereinabove in relation to the embodiments of FIGS. 1A–7C.

In any of the embodiments of the methods of the present invention, after any or all desired layers, or any combination of desired layers are deposited, the fuel cell 10, 10', 10'', 10''', 10'''' is sintered/annealed at temperatures ranging between about 200° C. and about 1500° C. In an alternate embodiment, the fuel cell 10, 10', 10'', 10''', 10'''' is sintered/annealed at temperatures ranging between about 600° C. and about 1100° C. It is to be understood that the temperature should be high enough to sinter the anode 16, cathode 18 and electrolyte 14, 14', 14'', not lower than the operating temperature of the fuel cell, and not higher than the current collectors 20 can withstand.

A method of using a fuel cell 10, 10', 10'', 10''', 10'''' may include the step of operatively connecting the fuel cell 10, 10', 10'', 10''', 10'''' to at least one of an electrical load L and an electrical storage device S. At least some of the plurality of current collectors 20 may be used to aid in accomplishing this connection.

Embodiments of the present invention are efficient in that they allow fabrication of relatively thin film fuel cells 10, 10', 10'', 10''', 10'''' for example, solid oxide fuel cells, by optional electrochemical techniques (e.g. electrophoretic and electrolytic depositions). Conductive members 20' used in these techniques may then be advantageously used as highly efficient current collectors 20 and/or sacrificial structures 30 (FIG. 1A).

Embodiments of the present invention are advantageous in that the methods of the present invention are relatively simple processes. Further, there is high surface area (efficient) utilization of current collectors 20. Yet further, if desired, gas tight sealing may be achieved. Still further, embodiments of the present invention render the ability to increase surface area of anodes 16/cathodes 18 without utilizing a ceramic etch.

While several embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A fuel cell, comprising:
   a plurality of fuel cell assemblies, each of the fuel cell assemblies including:
      an electrolyte having a length;
      an anode having a length and disposed on one side of the electrolyte; and
      a cathode having a length and disposed on one of the one side and an opposed side of the electrolyte; and
   a plurality of current collectors, each of the current collectors substantially embedded within at least one of the electrolyte, anode or cathode, established substantially parallel to the respective length of the at least one of the electrolyte, anode or cathode, and continuously extending substantially the respective length of the at least one of the electrolyte, anode or cathode, wherein each of the plurality of current collectors acts as an electrode for the electrodeposition of the at least one of the electrolyte, the anode, or the cathode.

2. The fuel cell as defined in claim 1 wherein at least some of the current collectors are selectively removed from the at least one of the electrolyte, anode or cathode to provide at least one gas flow channel.

3. The fuel cell as defined in claim 2 wherein the fuel cell is a dual chamber fuel cell, and wherein the gas is one of reactants and oxidants, wherein oxidants are carried to the cathode of each of the plurality of fuel cell assemblies, and wherein reactants are carried to the anode of each of the plurality of fuel cell assemblies.

4. The fuel cell as defined in claim 1 wherein the current collectors are formed from a conductive material.

5. The fuel cell as defined in claim 4 wherein the conductive material comprises at least one of gold, gold alloys, aluminum, aluminum alloys, platinum, platinum alloys, copper, copper alloys, nickel, nickel alloys, ruthenium, ruthenium alloys, ruthenium oxide, silver, silver alloys, palladium, palladium alloys, titanium, titanium alloys, tantalum, tantalum alloys, chromium, chromium alloys, iron, iron alloys, carbon, carbon alloys, $La_xSr_yMnO_{3-\delta}$, $La_xSr_yCrO_{3-\delta}$, conductive composites, conductive cermets, or mixtures thereof.

6. The fuel cell as defined in claim 1 wherein the fuel cell comprises one of solid oxide fuel cells, proton conducting ceramic fuel cells, alkaline fuel cells, Polymer Electrolyte Membrane (PEM) fuel cells, molten carbonate fuel cells, solid acid fuel cells, and Direct Methanol PEM fuel cells.

7. The fuel cell as defined in claim 1 wherein the electrolyte comprises at least one of oxygen ion conducting membranes, proton conductors, carbonate ($CO_3^{2-}$) conductors, $OH^-$ conductors, or mixtures thereof.

8. The fuel cell as defined in claim 1 wherein each of the cathode and the anode comprises at least one of metals, ceramics, or cermets.

9. The fuel cell as defined in claim 1 wherein each of the plurality of current collectors is substantially embedded within the electrolyte, and wherein each of the plurality of current collectors comprises:
   a discrete exposed surface continuously extending substantially the length of the electrolyte; wherein the exposed surface is covered by one of the anode and the cathode.

10. The fuel cell as defined in claim 9, further comprising an adhesion layer substantially surrounding each of the plurality of current collectors.

11. The fuel cell as defined in claim 10 wherein the adhesion layer is formed from at least one of tantalum, chromium, titanium or mixtures thereof.

12. The fuel cell as defined in claim 9, further comprising means for adhering each of the plurality of current collectors to the electrolyte and to the one of the anode and the cathode.

13. The fuel cell as defined in claim 1 wherein each of the plurality of current collectors is substantially embedded within at least one of the anode or the cathode, and wherein each of the plurality of current collectors comprises:
   a discrete exposed surface continuously extending substantially the length of the respective anode or cathode; wherein the exposed surface is covered by the electrolyte.

14. The fuel cell as defined in claim 13, further comprising means for adhering each of the plurality of current collectors to the at least one of the anode or the cathode and to the electrolyte.

15. The fuel cell as defined in claim 1 wherein at least one of the anode, cathode, electrolyte or current collector has outwardly angularly extending opposed side walls.

16. The fuel cell as defined in claim 1 wherein at least one of the anode, cathode, electrolyte or current collector has substantially vertically extending opposed side walls.

17. The fuel cell as defined in claim 1, further comprising means for connecting the fuel cell to at least one of an electrical load or an electrical storage device.

18. An electronic device, comprising:
   a load; and
   the fuel cell of claim 1 connected to the load.

19. A fuel cell, comprising:
   a plurality of fuel cell assemblies, each of the fuel cell assemblies including:
      an electrolyte having a length;
      an anode having a length and disposed on one side of the electrolyte; and
      a cathode having a length and disposed on one of the one side and an opposed side of the electrolyte; and
   a plurality of current collectors, each of the current collectors substantially embedded within at least one of the electrolyte, anode or cathode, established substantially parallel to the respective length of the at least one of the electrolyte, anode or cathode, and continuously extending substantially the respective length of the at least one of the electrolyte, anode or cathode;
   wherein the current collectors are formed from a conductive material that includes at least one of gold, gold alloys, aluminum, aluminum alloys, platinum, platinum alloys, copper, copper alloys, nickel, nickel alloys, ruthenium, ruthenium alloys, ruthenium oxide, silver, sliver alloys, palladium, palladium alloys, titanium, titanium alloys, tantalum, tantalum alloys, chromium, chromium alloys, iron, iron alloys, carbon, carbon alloys, $La_xSr_yMnO_{3-\delta}$, $La_xSr_yCrO_{3-\delta}$, conductive composites, conductive cermets, or mixtures thereof;
   and wherein the conductive composites include at least one of $La_xSr_yMnO_{3-\delta}+M$, $La_xSr_yCrO_{3-\delta}+M$, mixtures thereof, wherein M is at least one metal.

20. A fuel cell, comprising:
   a plurality of fuel cell assemblies, each of the fuel cell assemblies including:
      an electrolyte having a length;
      an anode having a length and disposed on one side of the electrolyte; and a cathode having a length and disposed on one of the one side and an opposed side of the electrolyte; and a plurality of current collectors, each of the current collectors substantially embedded within at least one of the electrolyte, anode or cathode, established substantially parallel to the respective length of the at least one of the electrolyte, anode or cathode, and continuously extending substantially the respective length of the at least one of the electrolyte, anode or cathode;

wherein the fuel cell is a single chamber fuel cell.

21. The fuel cell as defined in claim 20 wherein the plurality of fuel cell assemblies are exposed to a gas, and wherein the gas is a mixture of reactants and oxidants.

22. A fuel cell, comprising:
a plurality of fuel cell assemblies, each of the fuel cell assemblies including:
an electrolyte having a length;
an anode having a length and disposed on one side of the electrolyte; and
a cathode having a length and disposed on one of the one side and an opposed side of the electrolyte; and
a plurality of current collectors, each of the current collectors substantially embedded within, and continuously extending substantially the respective length of at least one of the anode or the cathode, each of the current collectors being established substantially parallel to the respective length of the at least one of the anode or the cathode, wherein each of the plurality of current collectors includes:
a discrete exposed surface continuously extending substantially the length of the respective anode or cathode; wherein the exposed surface is covered by the electrolyte; and
an adhesion layer substantially surrounding each of the plurality of current collectors.

23. The fuel cell as defined in claim 22 wherein the adhesion layer is formed from at least one of tantalum, chromium, titanium, or mixtures thereof.

24. A fuel cell, comprising:
a plurality of fuel cell assemblies, each of the fuel cell assemblies including:
an electrolyte having a length;
an anode having a length and disposed on one side of the electrolyte; and
a cathode having a length and disposed on one of the one side and an opposed side of the electrolyte; and
a plurality of current collectors, each of the current collectors substantially embedded within at least one of the electrolyte, anode or cathode, established substantially parallel to the respective length of the at least one of the electrolyte, anode or cathode, and continuously extending substantially the respective length of the at least one of the electrolyte, anode or cathode;
wherein each of the plurality of current collectors has a width ranging between about 1 micron and about 500 microns.

25. The fuel cell as defined in claim 24 wherein current collector width is between about 5 microns and about 100 microns.

26. The fuel cell as defined in claim 24 wherein each of the plurality of current collectors has a thickness ranging between about 0.1 micron and about 100 microns.

27. The fuel cell as defined in claim 26 wherein the current collector thickness ranges between about 1 micron and about 10 microns.

28. The fuel cell as defined in claim 24 wherein each of the plurality of current collectors has a length, and wherein the current collector length, the anode length, the cathode length, and the electrolyte length each range between about 0.01 cm and about 12 cm.

29. The fuel cell as defined in claim 28 wherein the current collector length, the anode length, the cathode length, and the electrolyte length each range between about 5 mm and about 25 mm.

30. The fuel cell as defined in claim 24 wherein the electrolyte has a thickness ranging between about 3 microns and about 1500 microns.

31. The fuel cell as defined in claim 30 wherein the electrolyte thickness ranges between about 15 microns and about 300 microns.

32. The fuel cell as defined in claim 24 wherein the electrolyte has an overall width ranging between about 0.01 cm and about 12 cm.

33. The fuel cell as defined in claim 32 wherein the electrolyte overall width ranges between about 5 mm and about 25 mm.

34. The fuel cell as defined in claim 24 further comprising a width between adjacent current collectors, wherein each of the anodes and cathodes has a thickness, and wherein the anode thickness and the cathode thickness are each less than about ½ the width between adjacent current collectors.

35. The fuel cell as defined in claim 34 wherein the width between adjacent current collectors ranges between about 1 micron and about 1500 microns.

36. The fuel cell as defined in claim 35 wherein the width between adjacent current collectors ranges between about 3 microns and about 500 microns.

37. The fuel cell as defined in claim 24 wherein each of the anodes and cathodes has a width, and wherein the anode width and the cathode width are each greater than the current collector width.

38. A fuel cell, comprising:
a plurality of fuel cell assemblies, each of the fuel cell assemblies including:
an electrolyte having a length;
an anode having a length and disposed on one side of the electrolyte; and
a cathode having a length and disposed on one of the one side and an opposed side of the electrolyte; and
a plurality of current collectors, each of the current collectors substantially embedded within at least one of the electrolyte, anode or cathode, established substantially parallel to the respective length of the at least one of the electrolyte, anode or cathode, and continuously extending substantially the respective length of the at least one of the electrolyte, anode or cathode;
wherein at least some of the current collectors are selectively removed from the at least one of the electrolyte, anode or sad cathode to provide at least one gas flow channel;
and wherein the at least some of the current collectors has a width ranging between about 40 microns and about 200 microns.

39. The fuel cell as defined in claim 38 wherein the at least some of the current collectors has a thickness ranging between about 0.1 microns and about 5 microns.

40. A fuel cell, comprising:
a plurality of fuel cell assemblies, each of the fuel cell assemblies including:
an electrolyte having a length;
an anode having a length and disposed on one side of the electrolyte; and
a cathode having a length and disposed on one of the one side and an opposed side of the electrolyte; and a plurality of current collectors, each of the current collectors substantially embedded within at least one of the electrolyte, anode or cathode, established substantially parallel to the respective length of the at least one of the electrolyte, anode or cathode, and continuously extending substantially the respective length of the at least one of the electrolyte, anode or cathode;

wherein each of the anode and cathode has a width, and wherein the ratio of anode width to cathode width varies.

41. The fuel cell as defined in claim 40, further comprising more than one current collector substantially embedded within the at least one of the electrolyte, anode or cathode.

42. A solid oxide fuel cell, comprising:
a plurality of fuel cell assemblies, each of the fuel cell assemblies including:
an electrolyte having a length;
an anode having a length and disposed on one side of the electrolyte; and
a cathode having a length and disposed on one of the one side and an opposed side of the electrolyte; and
a plurality of current collectors, each of the plurality of current collectors substantially embedded within at least one of the electrolyte, anode or cathode, established substantially parallel to the respective length of the at least one of the electrolyte, anode or cathode, and continuously extending the respective length of the at least one of the electrolyte, anode or cathode, wherein each of the plurality of current collectors acts as an electrode for the electrodeposition of the at least one of the electrolyte, the anode, or the cathode.

43. The solid oxide fuel cell as defined in claim 42 wherein at least some of the current collectors are selectively removed from the at least one of the electrolyte, anode or cathode to provide at least one gas flow channel.

44. The solid oxide fuel cell as defined in claim 42 wherein the plurality of current collectors is substantially embedded within the electrolyte, and wherein each of the plurality of current collectors comprises:
a discrete exposed surface continuously extending substantially the length of the electrolyte; wherein the exposed surface is covered by one of the anode and the cathode.

45. The solid oxide fuel cell as defined in claim 42 wherein the plurality of current collectors is substantially embedded within at least one of the anode or the cathode, and wherein each of the plurality of current collectors comprises:
a discrete exposed surface continuously extending substantially the length of the respective anode or cathode; wherein the exposed surface is covered by the electrolyte.

46. An electronic device, comprising:
a load; and
the solid oxide fuel cell of claim 42 connected to the load.

47. A solid oxide fuel cell, comprising:
a plurality of fuel cell assemblies, each of the fuel cell assemblies including:
an electrolyte having a length;
an anode having a length and disposed on one side of the electrolyte; and
a cathode having a length and disposed on one of the one side and an opposed side of the electrolyte; and
a plurality of current collectors, each of the plurality of current collectors substantially embedded within at least one of the electrolyte, anode or cathode, established substantially parallel to the respective length of the at least one of the electrolyte, anode or cathode, and continuously extending the respective length of the at least one of the electrolyte, anode or cathode;

wherein each of the plurality of current collectors has a width ranging between about 5 microns and about 100 microns; wherein each of the plurality of current collectors has a thickness ranging between about 1 micron and about 10 microns; wherein each of the plurality of current collectors has a length; and wherein the current collector length, the anode length, the cathode length, and the electrolyte length each range between about 0.01 cm and about 12 cm.

48. The solid oxide fuel cell as defined in claim 47 wherein the electrolyte has a thickness ranging between about 15 microns and about 300 microns, and wherein the electrolyte has an overall width ranging between about 0.01 cm and about 12 cm.

49. The solid oxide fuel cell as defined in claim 48, further comprising a width between adjacent current collectors, wherein each of the anodes and cathodes has a thickness, and wherein the anode thickness and the cathode thickness are each less than about ½ the width between adjacent current collectors.

50. The solid oxide fuel cell as defined in claim 49 wherein the width between adjacent current collectors ranges between about 5 microns and 300 microns.

51. The solid oxide fuel cell as defined in claim 50 wherein the width between adjacent current collectors ranges between about 15 microns and about 100 microns.

52. A solid oxide fuel cell, comprising:
a plurality of fuel cell assemblies, each of the fuel cell assemblies including:
an electrolyte having a length;
an anode having a length and disposed on one side of the electrolyte; and
a cathode having a length and disposed on one of the one side and an opposed side of the electrolyte; and
a plurality of current collectors, each of the plurality of current collectors substantially embedded within at least one of the electrolyte, anode or cathode, established substantially parallel to the respective length of the at least one of the electrolyte, anode or cathode, and continuously extending the respective length of the at least one of the electrolyte, anode or cathode;
wherein the at least some of the current collectors has a width ranging between about 40 microns and about 200 microns, and wherein the at least some of the current collectors has a thickness ranging between about 0.1 microns and about 5 microns.

53. A fuel cell formed by the process of:
depositing a first and a second conductive member on an electrolyte layer, wherein the first and second conductive members each have an exposed surface, the exposed surface being surface not in contact with the electrolyte;
depositing one of an anode layer and a cathode layer on the exposed surface of the first conductive member, wherein the first conductive member is a current collector for the one of the anode layer and the cathode layer; and
depositing the other of a cathode layer and an anode layer on the exposed surface of the second conductive member, wherein the second conductive member is a current collector for the other of the cathode layer and the anode layer.

54. A fuel cell formed by the process of:
depositing a plurality of first and second conductive members on a substrate, wherein the first and second conductive members each have a first exposed surface, the first exposed surface being surface not in contact with the substrate, and wherein the substrate has an exposed area, the exposed area being area not in contact with the plurality of first and second conductive members;
depositing an electrolyte layer on the first exposed surfaces of the first and second conductive members and on the substrate exposed area;
removing a predetermined amount of substrate so as to expose a discrete area comprising a repeating pattern of first conductive member, electrolyte, second conductive member, wherein each of the first and second conductive members have a second exposed surface, the second exposed surface being surface from which substrate has been removed;
depositing one of an anode layer and a cathode layer on the second exposed surface of the first conductive member, wherein the first conductive member is a current collector for the one of the anode layer and the cathode layer; and
depositing the other of a cathode layer and an anode layer on the second exposed surface of the second conductive member, wherein the second conductive member is a current collector for the other of the cathode layer and the anode layer.

55. A fuel cell formed by the process of:
depositing a first plurality of conductive members on one of an anode surface, a cathode surface, and a substrate, wherein the first plurality of conductive members each have an exposed surface, the exposed surface being surface not in contact with the one of the anode surface, the cathode surface, and the substrate, wherein the one of the anode surface, the cathode surface, and the substrate has an exposed area, the exposed area being area not in contact with the first plurality of conductive members;
depositing a first electrolyte layer on the exposed surfaces of the first plurality of conductive members and on the exposed area;
depositing a plurality of first and a second conductive members on the first electrolyte layer, wherein each of the plurality of first and second conductive members has an exposed surface, the exposed surface being surface not in contact with the first electrolyte layer;
depositing one of an anode layer and a cathode layer on the exposed surface of the first conductive member, wherein the first conductive member is a current collector for the one of the anode layer and the cathode layer;
depositing the other of a cathode layer and an anode layer on the exposed surface of the second conductive member, wherein the second conductive member is a current collector for the other of the cathode layer and the anode layer;
depositing a second electrolyte layer between adjacent anode and cathode layers;
depositing a second plurality of conductive members on at least some of the anode layers and the cathode layers, wherein each of the second plurality of conductive members has an exposed surface, the exposed surface being surface not in contact with the one of the anode layers and the cathode layers; and
depositing a third electrolyte layer over the second plurality of conductive members.

56. A fuel cell, comprising:
a plurality of fuel cell assemblies, each of the fuel cell assemblies including:
an electrolyte;
an anode having a length and disposed on one side of the electrolyte; and
a cathode having a length and disposed on one of the one side and an opposed side of the electrolyte; and
a plurality of current collectors, each of the current collectors completely embedded within at least one of the anode or cathode, established substantially parallel to the respective length of the at least one of the anode or cathode, and continuously extending substantially the respective length of the at least one of the anode or the cathode.

* * * * *

UNITED STATES PATENT AND TRADEMARK OFFICE
CERTIFICATE OF CORRECTION

PATENT NO. : 7,153,601 B2
APPLICATION NO. : 10/282772
DATED : December 26, 2006
INVENTOR(S) : Peter Mardilovich et al.

It is certified that error appears in the above-identified patent and that said Letters Patent is hereby corrected as shown below:

In column 6, line 25, delete "To" before "as a".

In column 14, line 6, in Claim 11, delete "titanium" and insert -- titanium, --, therefor.

In column 14, line 54, in Claim 19, delete "sliver" and insert -- silver --, therefor.

In column 14, line 60, in Claim 19, insert -- or -- before "mixtures".

In column 16, line 52, in Claim 38, delete "sad" before "cathode".

Signed and Sealed this

Twenty-ninth Day of September, 2009

David J. Kappos
*Director of the United States Patent and Trademark Office*